2,814,945
ROTATIONAL VISCOSIMETER

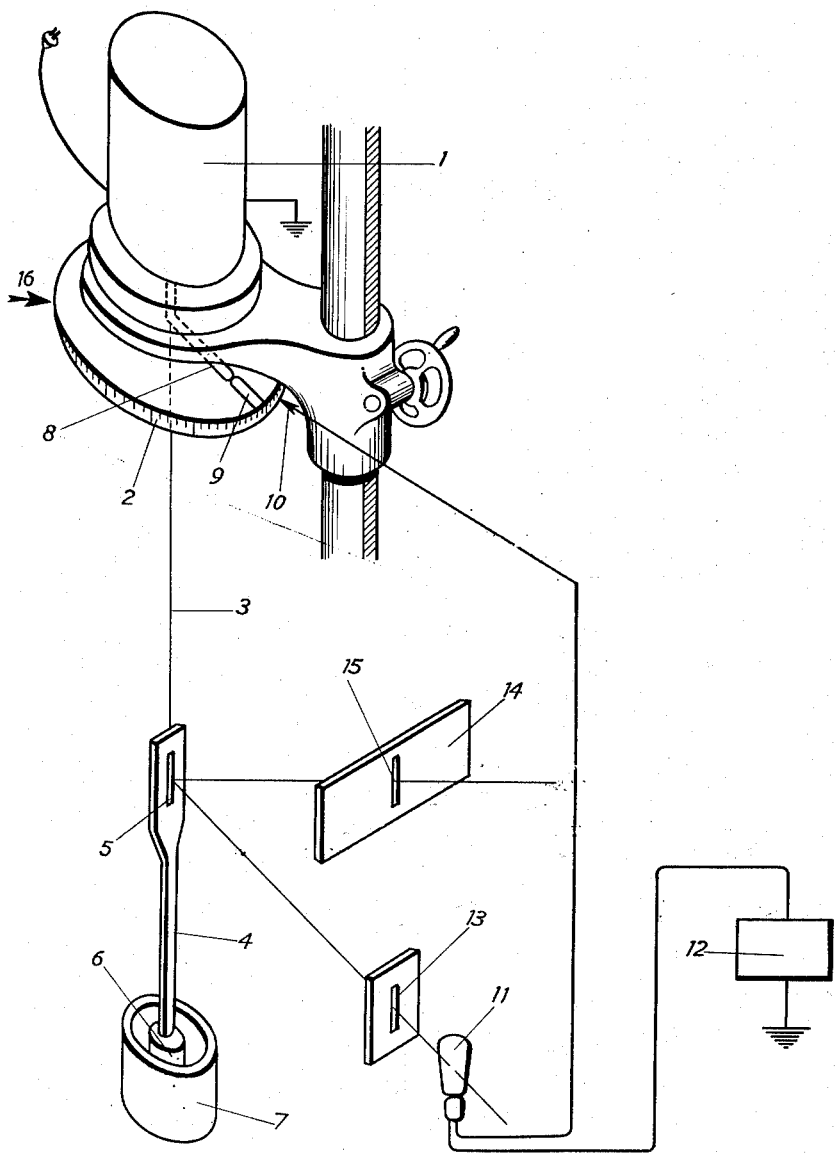

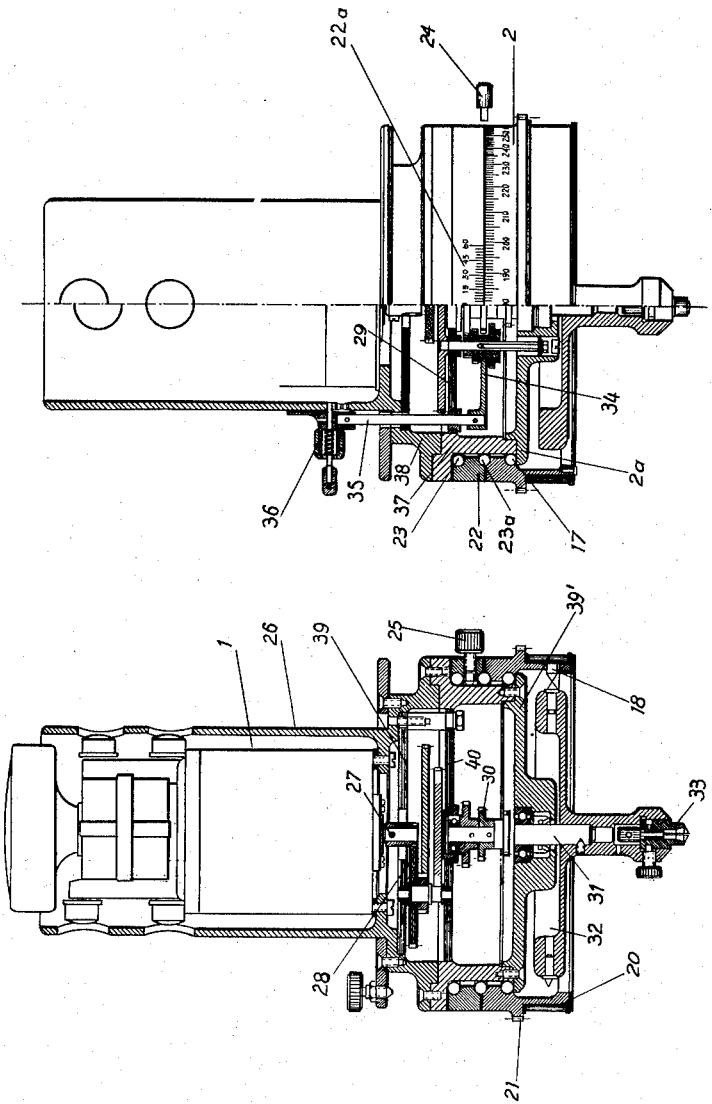

Raymond Michaux and Henry Ruelland, Saint-Germain-en-Laye, France, assignors to Institut de Recherches de la Siderurgie, Saint-Germain-en-Laye, France, a professional institution Application October 15, 1954, Serial No. 462,514

Claims priority, application France October 16, 1953

3 Claims. (Cl. 73—59)

The definition of some physical magnitudes is often obtained by measuring an angular shifting on a rotary dial provided with a scale and cooperating with a likewise rotary indicator hand. Since the observer is himself stationary with reference to the two rotary parts and forms part of a stationary system of coordinates with reference to the said rotary parts, it is very difficult for him to read the relative angular shifting of the hand with reference to the scale on the dial. This is the case e. g. for the measurement of the angle of twist of the movable system of a viscosity meter including coaxial cylinders, which movable system is caused to assume a uniform rotary movement while part of it is immersed in the mass of the liquid or like material the viscosity of which is to be defined, and the angle of twist of the thread to which the movable system is suspended, is measured by means of a hand secured to the thread underneath the suspension point and moving over a graduated dial revolving in unison with the said suspension point.

It has already been proposed to measure this angle of twist by providing coincidence between a stationary mark and the image of a luminous slot illuminated periodically and reflected by a small mirror glued or otherwise secured to the lower end of the suspension thread; the illumination is controlled by an electric switch carried by the member to which the thread is anchored, the said switch closing the circuit of the illuminating bulb exactly at the moment at which it registers with a slider adjustably movable over an annular scale. When the desired coincidence is reached, the angle by which the slider has been shifted between two positions corresponding respectively to measurement with no liquid in the cylinder and to measurement with the cylinder filled with liquid, defines the angle of twist of the thread.

However, this prior arrangement does not generally provide a satisfactory accuracy. As a matter of fact, the subdivisions to be read with the bare eye on the annular scale actually allow in practice estimating only angular shiftings which are comparatively large. Furthermore, the conventional mirror arrangements allow measuring only small angles. On the other hand, it is necessary that the duration of illumination of the luminous slot by a bulb be smaller than the time required for the movable system to move through the angle to be measured, and this requires in all cases that the said angle to be measured be larger than a limit value which does not allow highly accurate measuring. Lastly, since the speed of rotation of the movable system may vary, the duration of illumination of the slot should be independent of the said speed.

Our invention has for its object to remove the above drawbacks and to produce an arrangement for measuring through measuring means the angle of twist of a movable system whereby a high accuracy may be obtained, whatever the speed of rotation of the system and the magnitude of the angle of twist may be.

To this end, our invention has for its object an arrangement for measuring, through stationary means, the angle of twist of a movable system driven into rotation, the said arrangement including a flashlight located in front of a slot and the ignition of which is controlled by an electric switch one component of which is rigid with the upper end of the twistable thread carrying the movable system, the circuit of the flash-light being associated with an annular scale to which is secured the other component of the electric switch; this annular scale is designed so as to be adjustably shiftable with reference to a stationary vernier the position of which is adjusted at the start, the adjustable shifting of said scale with reference to the zero of the vernier being such that the flash is produced exactly at the moment at which the image of the flash-light reflected by a small mirror secured to the lower part of the suspension thread submitted to twisting, impinges on a mark which is stationary in space, the duration of the flash being independent of the duration of closing of the illuminating circuit.

In order to allow our invention to be more readily understood, we have disclosed hereinafter and illustrated in accompanying drawings a preferred embodiment thereof given by way of a mere exemplification and by no means in a limiting sense. In said drawings:

Fig. 1 illustrates diagrammatically a measuring instrument according to our invention.

Fig. 2 includes a half-elevational view and a half-longitudinal cross-section of the annular scale and vernier;

Fig. 3 is a longitudinal sectional view thereof in a plane perpendicular to the half-section shown in Fig. 2.

Turning to Fig. 1, it is apparent that the arrangement includes a motor 1 and an annular scale 2, the housing of said motor being rigidly fixed on the stationary frame of the device, not shown. The motor 1 actuates a driving member or head, not shown, carrying a suspension and twistable thread 3 to the lower end of which is secured a rigid system 4 carrying a small mirror 5. The rigid system 4 carries at its lower end a cylindrical member 6 which is immersed in the material to be investigated and filling the cylinder 7 coaxial with the cylinder 6.

The twistable thread carries at its upper end one component 8 of the rotary switch which moves over the second component 9 rigid with the annular scale 2. A brush 10 rubbing over the periphery of the annular scale is connected with the circuit of the flash-light 11 of the conventional electronic flash type, said flash-light being fed by an electronic generator 12. The illumination produced by the flash-light is directed through a very narrow slot 13 onto the mirror 5 which reflects it so as to form a spot on the ground glass 14 provided with a mark 15.

The annular scale is adapted to move in front of a mark 16 which is stationary in space and which is associated with a vernier. As it passes over the switch component 9 rigid with the annular scale, the switch component 8 closes the circuit feeding the circuit of the electronic flash-light 11. The measurement is executed by shifting first the annular scale with reference to the upper part of the instrument until the angular position of the switch component 9 allows obtaining the image of the slot exactly on the mark 15. The angle of twist is measured by means of the vernier, said angle being equal to the difference between the reading obtained when the cylinder 7 is empty and the reading obtained when the material to be investigated has been introduced inside the cylinder 7.

The electric motor 1 located inside the protecting casing 26 made of a light alloy has an output shaft 27 meshing with a gearing 28 so as to reduce the speed of rotation. The machine is adapted to operate on three different speeds. The change in speed is obtained through a set of sliding gears 29 which engages the set of pinions 30, the spindle 31 of which carries the contact making disc 32 and the clamping means 33 for the wire.

When it is desired to change the speed of rotation, the spindle 35 and the knob 36 are actuated so as to shift vertically the fork 34 which sets the sliding gears 29 in the desired location.

These different parts—pinions and bearings—are secured through plates 39 and 40 to the stationary members 37, 38, and 39'.

These stationary members also carry two annuli, of which a first annulus 2 carries a 360° scale and the other annulus 22, a vernier scale 22a. These annuli may, as provided through the ball systems 23, 23a and 17, rotate around the stationary member 37.

The annulus 22 may be locked on the stationary member 37 in any desired position through the screw 25. As to the annulus 2, it carries the stationary brush section 18 of the rotary electric switch, the movable section 8 of which is rigid with the disc 32.

It should also be mentioned that the annuli 2 and 22 may be rigidly secured together through a stud 24 engaging through half its thickness the annulus 2 and through its other half the annulus 22.

Lastly, the annulus 2 carries a rack 21 the control knob of which, not illustrated, allows a micrometric rotation of the said annulus.

The operation of the arrangement described is as follows:

The two annuli being interconnected through the stud 24, the zero position is obtained by operating with a liquid having a zero viscosity so that the twist imparted to the wire 3 may be zero. The spot of the flash is then shifted onto the mark 15 of the cross hairs or ground glass 14. Zero conditions are then obtained. The two annuli are then disengaged through removal of the stud 24 and the annulus 22 is locked in position through the screw 25. Thus, the location of the vernier zero is well defined in space and corresponds to a zero viscosity.

Now, when operating with the liquid the viscosity of which is to be defined, the flash is formed no longer at the moment of the passage of the mirror and, with a view to returning the flash onto the mark on the ground glass, the annulus 2 is shifted until the adjustable brush section 18 of the electric switch enters a position corresponding to the angle of twist sought for. The torsional angle which is to be ascertained is obtained through a direct reading on the annular scale 2 in register with the vernier zero.

In practice, the instrument described allows obtaining a reading with a high accuracy depending on the scale selected for the vernier; the angular shifting measured may, in fact, reach 360°. It is easy to prevent the possible error from rising beyond an angle of 3". As the electronic flash lasts for a very short time, say $\frac{1}{10000}$ of a second and has a considerable illuminating power, it is possible to obtain a very brilliant spot even in full daylight. Lastly, the duration of the flash is independent of the duration of the electric contact obtained between the switch components 8 and 9 since the flash is produced by the discharge of a condenser. The execution of the switches including such components becomes thus a very simple matter.

Obviously, it is possible, within the scope of the invention, as defined in accompanying claims, to modify various parts of the instrument and the manner of associating them.

What we claim is:

1. An instrument for measuring the angle of twist of a thread carrying a rotary system and submitted therewith to a rotary movement, comprising a motor controlling the angular movement of the thread, a flash-light, a slotted diaphragm adapted to be illuminated by said flash-light, a circuit adapted to energize the flash-light, a switch controlling said circuit and including two components of which one is rigid with the upper end of the twistable thread, an annular scale surrounding coaxially the twistable thread, carrying the other component of the switch, a normally stationary vernier cooperating with said annular scale, means for angularly shifting the location of the vernier, means for angularly shifting said annular scale with reference to the zero of the vernier, a small mirror secured to the lower end of the twistable thread and a mark stationary in space on which the flash produced for a predetermined angular location of the annular scale with reference to the vernier and transmitted through the slot in the diaphragm is adapted to be reflected for shiftings of the annular scale back through angles corresponding to the modifications in the angle of twist of the thread with reference to zero conditions.

2. A viscosimeter comprising a container adapted to be filled with the material to be investigated, a cylinder immersed in said container, a thread to which said cylinder is suspended, a motor adapted to impart a rotary movement to said thread and cylinder, a flash-light, a slotted diaphragm adapted to be illuminated by said flash-light, a mirror rigid with the cylinder in the viscosity measuring container and on which the flash from the flash-light is projected through the slot in the diaphragm, a circuit adapted to energize the flash-light, a switch controlling said circuit and including two components of which one is rigid with the upper end of the thread, an annular scale surrounding coaxially the thread and carrying the other component of the switch, a normally stationary ring coaxial with the annular scale and carrying a vernier cooperating with the latter, means for angularly shifting the location of the vernier ring to bring it into a well-defined starting position, means for angularly shifting the annular scale with reference to the vernier and a mark stationary in space on which the flash transmitted through the slot in the diaphragm is reflected by the mirror for a position of the annular scale corresponding to a shifting of the annular scale by an angle equal to the modification in the angle of twist of the twistable thread with reference to zero conditions producing the flash through closing of the circuit controlling switch.

3. An instrument for measuring the angle of twist of a thread carrying a rotary system and submitted therewith to a rotary movement, comprising a motor controlling the angular movement of the thread, a flashlight, a slotted diaphragm in front of said flashlight, illuminated by said flashlight upon energizing the latter, an electric source connected to the flashlight, a switch controlling said flashlight and including two components of which one is rigid with the upper end of the twistable thread, an annular scale surrounding coaxially the twistable thread, carrying the other component of the switch, means for angularly shifting said annular scale, a small mirror secured to the lower end of the twistable thread and a mark stationary in space and located in such a place that the flash produced for a predetermined angular location of the annular scale and transmitted through the slot in the diaphragm is reflected thereon for shiftings of the annular scale back through angles corresponding to the modifications in the angle of twist of the thread with reference to zero conditions.

References Cited in the file of this patent

UNITED STATES PATENTS

| | | |
|---|---|---|
| 1,613,262 | Aoki | Jan. 4, 1927 |
| 2,193,079 | Schrader | Mar. 12, 1940 |
| 2,303,162 | Godwin et al. | Nov. 24, 1942 |

FOREIGN PATENTS

| | | |
|---|---|---|
| 684,935 | Great Britain | Dec. 24, 1952 |